United States Patent [19]

Matsuo

[11] Patent Number: 4,698,696
[45] Date of Patent: Oct. 6, 1987

[54] NOISE REDUCTION CIRCUIT FOR VIDEO TAPE RECORDING AND PLAYBACK APPARATUS

[75] Inventor: Yasutoshi Matsuo, Yokohama, Japan

[73] Assignee: Victor Company of Japan, Ltd., Japan

[21] Appl. No.: 838,552

[22] Filed: Mar. 11, 1986

[30] Foreign Application Priority Data

Mar. 13, 1985 [JP] Japan .................................. 60-49609

[51] Int. Cl.$^4$ ........................ H04N 5/76; H04N 5/21
[52] U.S. Cl. .................................... 358/340; 358/167
[58] Field of Search .............. 358/310, 327, 328, 329, 358/336, 340, 166, 167, 223; 360/33.1

[56] References Cited

U.S. PATENT DOCUMENTS

| | | | |
|---|---|---|---|
| 4,249,209 | 2/1981 | Storey | 358/167 |
| 4,249,210 | 2/1981 | Storey et al. | 358/167 |
| 4,291,330 | 9/1981 | Hirai | 358/336 |
| 4,322,746 | 3/1982 | Oguino | 358/167 |
| 4,563,704 | 1/1986 | Hirota | 358/167 |

FOREIGN PATENT DOCUMENTS

| | | |
|---|---|---|
| 2917022 | 11/1979 | Fed. Rep. of Germany . |
| 3223066 | 1/1985 | Fed. Rep. of Germany . |
| 57-211885 | 12/1982 | Japan .................................. 358/167 |

*Primary Examiner*—Donald McElheny, Jr.
*Attorney, Agent, or Firm*—Lowe, Price, LeBlanc Becker & Shur

[57] ABSTRACT

Disclosed is a noise reduction circuit for reducing noise contained in a luminance signal, wherein a first subtractor has a first input terminal connected to be responsive to the luminance signal. A low-pass filter passes a low-frequency component of the output of the first subtractor to a second subtractor which combines it with the luminance signal to extract high-frequency noise contained therein. The extracted noise is limited in amplitude by a limiter and applied through a feedback circuit to the second input terminal of the first subtractor. The noise reduction circuit operates as if it were a low-pass filter having a cutoff frequency which increases as a function of the level of the luminance signal to reduce the length of time in which smear and noise tend to occur in response to high amplitude luminance signals.

11 Claims, 19 Drawing Figures

FIG. 2
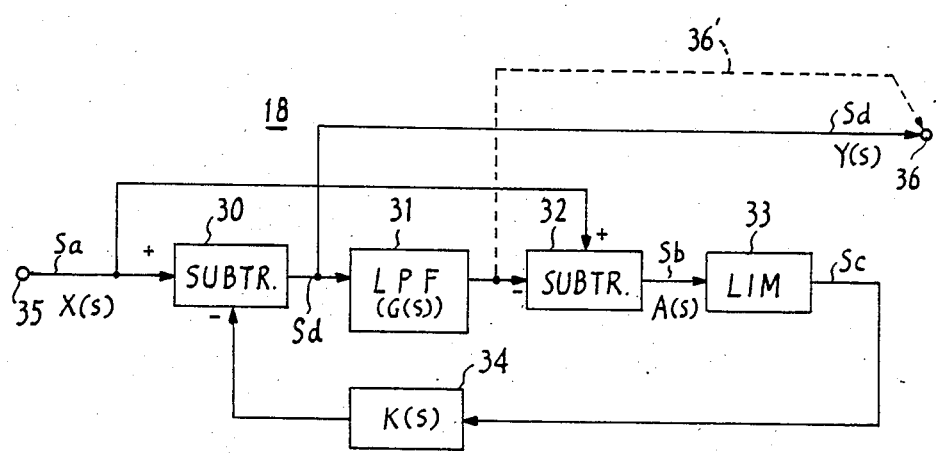
FIG. 3  FIG. 4
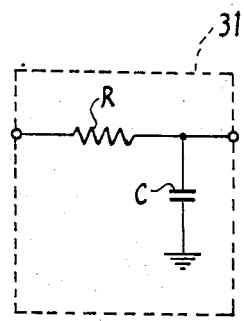 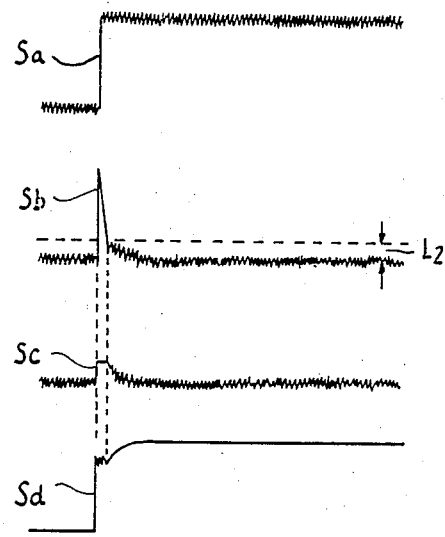

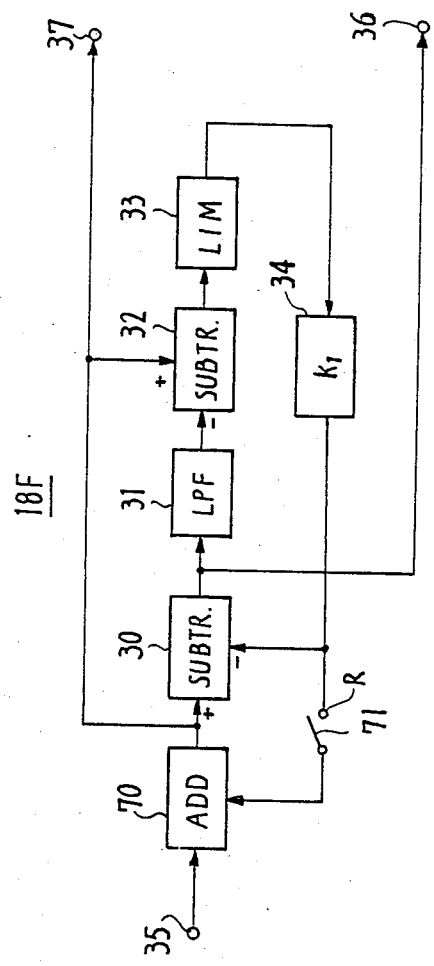

NOISE REDUCTION CIRCUIT FOR VIDEO TAPE RECORDING AND PLAYBACK APPARATUS

BACKGROUND OF THE INVENTION

The present invention relates to noise reduction, and more particularly to a noise reduction circuit for reducing noise and smear which tend to develop in the luminance output of video tape recording and reproducing apparatus.

In a recording mode of color television video tape recorders, the luminance component of a video signal is passed through a noise reduction circuit of a recording section of the recorder to a preemphasis circuit to accentuate its higher frequency components against high-frequency noise which might be introduced during recording and is frequency-modulated before being fed to video heads, while the chrominance component is converted in frequency so that it occupies a lower frequency part of the video spectrum. In playback, the luminance signal is frequency-demodulated, deemphasized and fed to a noise reduction circuit of the playback section of the recorder before being combined with the chrominance component which has been reconverted to the original frequency.

As shown in FIG. 16, the noise reduction circuit of the recording section comprises a low-pass filter 110 to which the luminance signal $R_1$, FIG. 17, is applied. The output $R_2$ of low-pass filter 110 and the luminance signal $R_1$ are combined in a subtractor 111 to supply a subtractor output to a multiplier 112 which multiplies the input signal by a prescribed factor, producing a signal $R_3$. A limiter 113 limits the amplitude of the multiplier output $R_3$ to produce an amplitude-limited signal $R_4$ having an amplitude not exceeding a prescribed value $L_1$. The limiter output $R_4$ and the luminance signal $R_1$ are summed in an adder 114 to produce an output $R_5$, which is applied to the preemphasis circuit.

The noise reduction circuit of the playback section, which is shown in FIG. 18, comprises a noise rejection filter 120 which removes high-frequency noise introduced to a deemphasized luminance signal $P_1$ to produce a noise-eliminated signal $P_2$, FIG. 19. The noise-eliminated signal $P_2$ is applied to a negative input of a first subtractor 121 which receives signal $P_1$ at the positive input to provide subtraction of signal $P_2$ from signal $P_1$ to supply a first subtractor output $P_3$ to a demultiplier 122 which multiplies the amplitude of the input signal by a factor which is determined in relation to the multiplying factor of the noise reduction circuit of the recording section. The output of demultiplier 122, indicated at $P_3$, is applied to a limiter 123. Low-pass filter 120 and subtractor 121 constitute a high-pass filter which extracts the noise component contained in the reproduced luminance signal. Limiter 123 limits the amplitude of the extracted noise component $P_4$ to a maximum value $L_1$ to produce a limiter output $P_4$ to eliminate high-amplitude peaks which would otherwise cause "smear" in the video screen. The amplitude-limited noise component $P_4$ is applied to the negative input of a second subtractor 116 which subtracts it from the noise-contaminated signal Phd 1 to generate a noise-reduction output $P_5$, which is applied to the mixer.

The cutoff frequency of low-pass filter 120 is set at a value normally in the range between 300 kHz and 1 MHz and the maximum amplitude of limiter 115 is set at a value in the range between 2% and 5% of the highest value of the luminance signal. As a result, the extracted noise component $P_4$ has a duration as large as several hundreds nanoseconds and during this period the noise component cannot be removed. Furthermore, there appears a smear in the video screen to an extent determined by the maximum level of the limiter.

While the smear can be reduced by setting the cutoff frequency of low-pass filter 120 to a higher value and the noise can be reduced by setting the maximum level of the limiter as high as possible, the low-pass filter having a higher cutoff frequency would increase the noise, whereas the limiter with a higher maximum threshold would increase the smear. The usual practice is therefore to seek a compromise between these conflicting factors.

SUMMARY OF THE INVENTION

It is therefore an object of the invention to provide an improved noise reduction circuit having reduced smear and noise at the edges of high amplitude luminance signals as well as low amplitude luminance signals.

The noise reduction circuit of the invention comprises a first subtractor having a first input terminal to which a luminance signal is applied and a second input terminal and a low-pass filter for passing therethrough a low-frequency component of an output signal from the first subtractor. A second subtractor is provided having a first input terminal to which the luminance signal is applied and a second input terminal to which the output of the low-pass filter is applied. The output of the second subtractor represents high-frequency noise contained in the luminance signal, which is limited in amplitude by a limiter and applied through a feedback circuit to the second input terminal of the first subtractor.

The noise reduction circuit operates as if it were a low-pass filter having a cutoff frequency which increases as a function of the level of the luminance signal. Due to the increase in cutoff frequency, the length of time in which smear and noise would occur in response to high amplitude luminance signals is significantly reduced.

BRIEF DESCRIPTION OF THE DRAWINGS

The present invention will be described in further detail with reference to the accompanying drawings, in which:

FIG. 2 is a block diagram of the noise reduction circuit of the playback section of the apparatus;

FIG. 3 is a circuit diagram of the low-pass filter of FIG. 2;

FIG. 4 is a waveform diagram associated with the embodiment of FIG. 2;

FIG. 13 is a block diagram of a further modification of the embodiment of FIG. 7;

DETAILED DESCRIPTION

Figure 1:
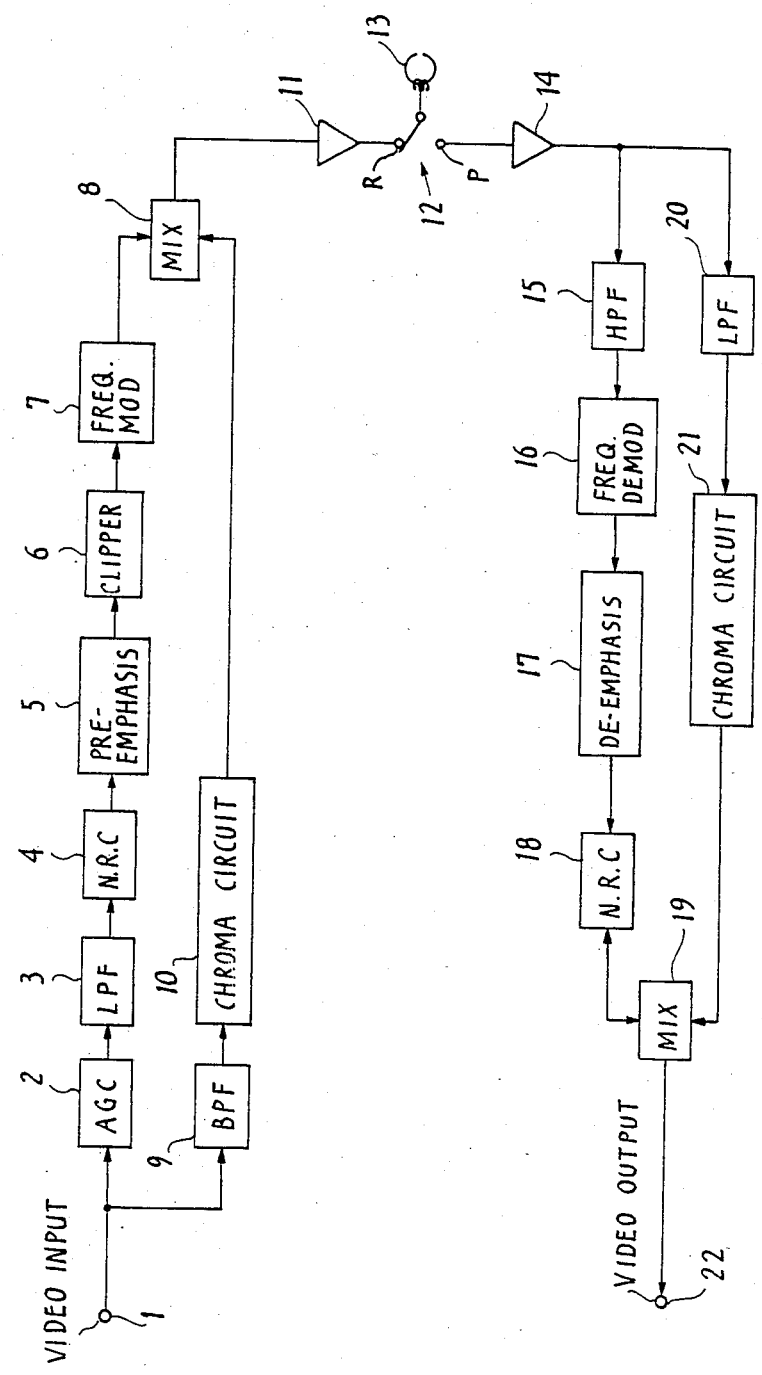
FIG. 1 is a general block diagram of a video tape recording and playback apparatus embodying noise reduction circuits of the present invention.

Referring now to FIG. 1, there is a block diagram of a video tape recorder embodying the present invention. The composite color television input signal is applied through an input terminal 1 and an automatic-gain controlled amplifier 2 to a low-pass filter 3 which passes the luminance component of the composite signal to a noise reduction circuit 4. After passing through the noise reduction circuit 4, the luminance signal is accentuated by a preemphasis circuit 5 and is passed through a clipper 6 to a frequency modulator 7 and thence to one input of a mixer 8. The television input signal is also applied to a band-pass filter 9 that extracts the chrominance component of the input signal and passes it to a chroma circuit 10 where the chrominance signal is converted in frequency so that it occupies a lower frequency band of the video spectrum. The frequency-converted chrominance signal is applied to the second input of mixer 8 and multiplexed in frequency with the frequency-modulated luminance signal. The output of mixer 8 is passed through a recording amplifier 11 which is coupled by a mode selecting switch 12 to a video head 13 during recording modes.

During a playback mode, the output of video head 13 is passed through switch 12 to a recording amplifier 14 and thence to a high-pass filter 15 through which the frequency-modulated luminance signal is passed to a frequency demodulator 16 to recover the original luminance signal, this signal being deemphasized by deemphasis circuit 17 and applied to a nois reduction circuit 18 which is constructed according to the present invention. The output of noise reduction circuit 18 is combined in a mixer 19 with a chrominance signal which is derived through a low-pass filter 20 and chroma circuit 21 which reconverts the frequency of the low-pass filter output to the original frequency value. Mixer 19 supplies a color television composite signal to an output terminal 22.

Referring to FIG. 2, details of the noise reduction circuit 18 of the playback section are illustrated. The circuit comprises a first subtractor 30, a low-pass filter 31 having a transfer function (GS), a second subtractor 32, a limiter 33 and a multiplier 34 having a transfer function K(S) which represents the feedback constant of the noise reduction circuit. The input signal supplied to terminal 35 from the deemphasis circuit 17 is as shown at Sa in FIG. 4, this signal being applied to a positive input of the first subtractor 30 to be subtracted by a signal at the positive input which is fed from multiplier 34, the output of subtractor 30 being applied through the low-pass filter 31 which rejects the high frequency noise contained in the input signal Sa. The output of low-pass filter 31 is coupled to a negative input of the second subtractor 32 which subtracts it from the input signal Sa applied to its positive input. Low-pass filter 31 and second subtractor 32 constitute a high-pass filter which extracts the high-frequency noise as shown at Sb contained in the input signal Sa. The amplitude of the extracted noise Sb is limited in amplitude by the limiter 33 to a maximum $L_2$, producing an output Sc to prevent the occurrence of smear in the video screen. Limiter 33 has an output to the multiplier 34. By subtracting the amplitude-limited, multiplied noise Sc from the noise-containing input signal Sa results in the generation of a noise-reduced output signal Sd which is supplied from the output of subtractor 30 to an output terminal 36 and thence to the mixer 19.

If the low-pass filter 31 is an RC network comprising a resistor R and a capacitor C as shown in FIG. 3, the transfer function G(S) of the low-pass filter 31 is given as follows:

$$G(S) = \frac{1/Cs}{R + (1/Cs)} = \frac{1}{1 + CRs} = \frac{1}{1 + Ts} \quad (1)$$

where T is the time constant of low-pass filter 31. The noise reduction circuit of FIG. 2 can be mathematically analyzed as follows:

$$Y(s) = X(s) - A(s)K(s) \quad (2)$$
$$A(s) = X(s) - Y(s)G(s) \quad (3)$$

where, $X(s)$ = input signal at terminal 35,
$Y(s)$ = output signal at terminal 36,
$A(s)$ = output of subtractor 32,
$G(s)$ = transfer function of low-pass filter 31, and
$K(s)$ = multiplying factor of multiplier 34.

From Equations 2 and 3, the following Equations hold:

$$Y(s) = X(s) - \{X(s) - Y(s)G(s)\}K(s)$$
$$= X(s)\{1 - K(s)\} + K(s)Y(s)G(s)$$

therefore, $$\frac{Y(s)}{X(s)} = \frac{1 - K(s)}{1 - K(s)G(s)} \quad (4)$$

From Equations 1 and 4, $$\frac{Y(s)}{X(s)} = \frac{1 - k}{1 - \frac{k}{1 + Ts}} = \frac{(1 - k)(1 + Ts)}{1 - k + Ts} \quad (5)$$

where k is K(s) and typically 0.8.
By dividing the numerator and denominator by a factor $(1 - k)$, Equation 5 is rewritten as follows:

$$\frac{Y(s)}{X(s)} = \frac{1 + Ts}{\frac{1 - k + Ts}{1 - k}} = \frac{1 + Ts}{1 + \frac{1}{1 - k} Ts} \quad (6)$$

Equation 6 holds if the input signal of limiter 6 is lower than its threshold level $L_2$. However, if it is higher than threshold level $L_2$, Equation 6 should be rewritten as follows:

$$\frac{Y(s)}{X(s)} = \frac{1 + Ts}{1 + \frac{1}{1 - L_2 \cdot k} Ts} \quad (7)$$

By setting the threshold level $L_2$ at 5% of the maximum amplitude, for example, the factor $T_s/(1-L_2k)$ is approximately equal to $T_s$ and thus the ratio $Y(s)/X(s)$ is substantially equal to unity. For small-amplitude signals, the ratio $Y(s)/X(s)$ decays with frequency beginning at a cutoff frequency $f_1$ and terminating at frequency $f_2$, where $f_1$ and $f_2$ are given by:

$$f_1 = \frac{1}{\frac{1}{1-k}T} \quad (8a)$$

$$f_2 = \frac{1}{T} \quad (8b)$$

For large-amplitude signals, the noise reduction circuit exhibits a cutoff frequency $f_1'$ which is given by:

$$f_1' = \frac{1}{\frac{1}{1-kL_2}T} \quad (8c)$$

Since $f_1'$ is greater than $f_1$ and the threshold factor of Equation 8c becomes increasingly, predominant with the increase in signal level, $f_1'$ approaches $f_2$, causing the decay line to shift leftwards as shown at b, c, d and e.

As a result, the noise reduction circuit can be considered as a low-pass filter having a cutoff frequency $1/1-k$ times higher than the prior art for small-amplitude signals and a cutoff frequency $1/1-L_2k$ times higher than the prior art for large-amplitude signals. When the noise reduction circuit receives a large-amplitude input signal, the cutoff frequency $f_1$ is automatically raised and the amount of time in which the amplitude is cut-off by limiter 33 is reduced. As a result, the amount of smear and noise that occur in response to a large-amplitude signal can be reduced even if the same time constant and the same limiter threshold are used as in the prior art noise reduction circuits.

If a k-value slightly smaller than unity is employed, the output signal $Y(s)$ can be withdrawn from the output of low-pass filter 31 as indicated by a broken line 36'. In this case, noise components outside the video frequency spectrum can be significantly reduced.

Figure 6:
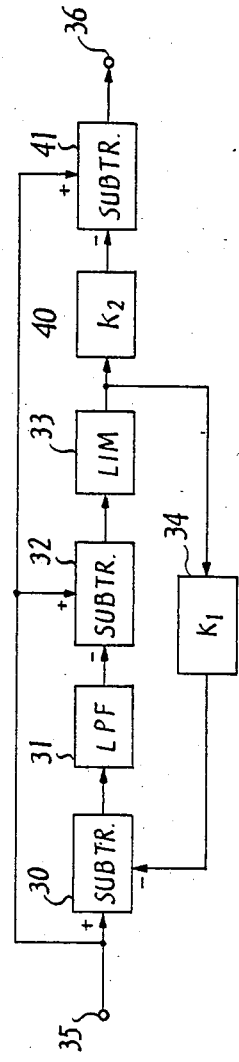
FIG. 6 is a block diagram of a modified form of the embodiment of FIG. 2.

In the embodiment of FIG. 2, the k-value exclusively determines the cutoff frequency $f_1$ and the noise reduction level, an embodiment shown in FIG. 6 allows determinations of the cutoff frequency and noise reduction level to be made independently.

Figure 5:
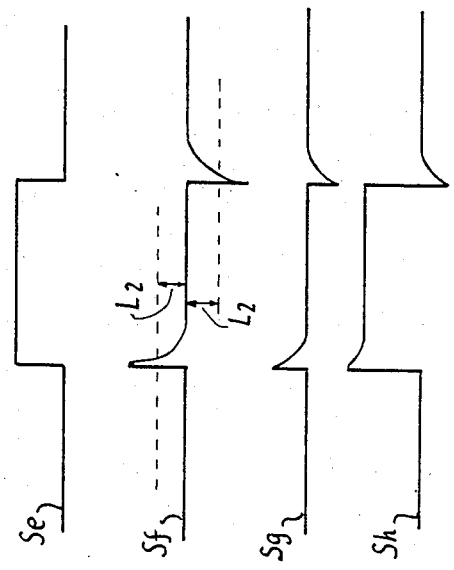
FIG. 5 is a graphic illustration of the operating characteristics of the embodiment of FIG. 2.

A noise reduction circuit generally indicated at 18A in FIG. 6 differs from the circuit 18 of FIG. 2 in that it additionally includes a multiplier 40 having a multiplying factor $k_2$ and a third subtractor 41. Multiplier 40 has an input from the output of limiter 33 and an output leading to a negative input of the subtractor 41, the positive input of subtractor 41 being connected to the input terminal 35. The output signal of the noise reduction circuit 18A is taken from the output of subtractor 41. This embodiment has the following $Y(s)/X(s)$ ratio:

$$\frac{Y(s)}{X(s)} = \frac{1 + \frac{1-k_2}{1+k_1}T_s}{1 + \frac{1}{1-k_1}T_s} \quad (9)$$

where, $k_1$ represents the multiplying factor of multiplier 34. For small-amplitude signals, the decay line a extends as indicated by a broken-line a' in FIG. 5. In this embodiment, the cutoff frequency is exclusively determined by the $k_1$ value and the noise reduction level is exclusively determined by the $k_2$ value.

Figure 7:
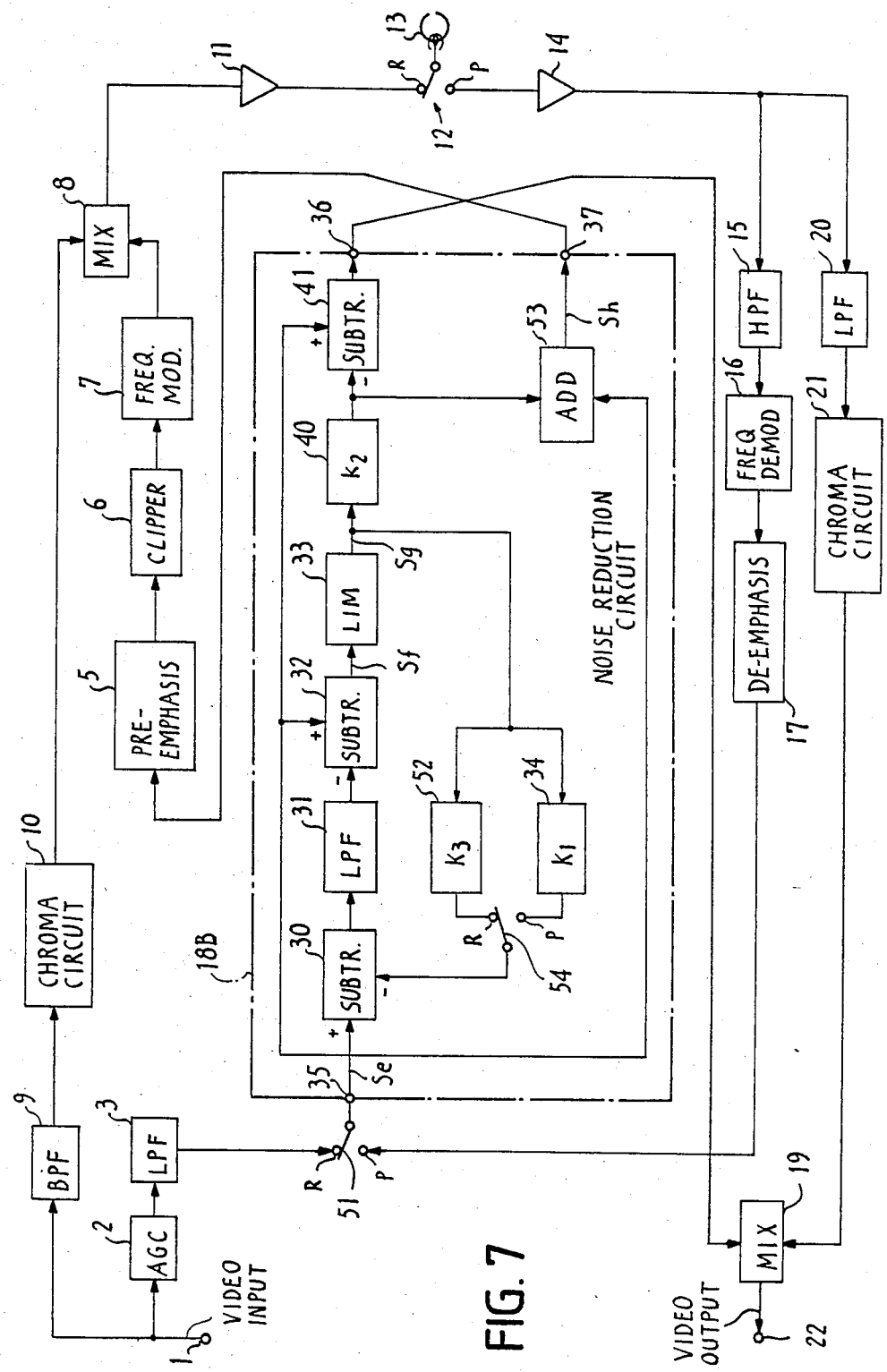
FIG. 7 is a block diagram of a noise reduction circuit which is commonly used for recording and playback modes.

FIG. 7 is a block diagram of a video tape recording and reproducing apparatus incorporating a common noise reduction circuit 18B, wherein parts corresponding to those in FIGS. 1, 2 and 6 are marked with like numerals. Noise reduction circuit 18B is connected to the recording section of the apparatus by coupling its input terminal 35 through a mode selecting switch 51 to the output of low-pass filter 3 and is connected to the playback section by coupling the input terminal 35 to the output of deemphasis circuit 17.

Noise reduction circuit 18B additionally includes a multiplier 52 having a multiplying factor $k_3$ and an adder 53. Multipliers 34 and 52 have their input terminals coupled together to the output of limiter 33 and their output terminals coupled selectively by a mode selecting switch 54 to the negative input of subtractor 30. Adder 53 is connected to sum the output of multiplier 40 with the input signal at terminal 35 and supplies a summed output to an output terminal 37 which is connected to the input of preemphasis circuit 5. The output terminal 36 is connected to mixer 19 as in the previous embodiments.

Figure 8:
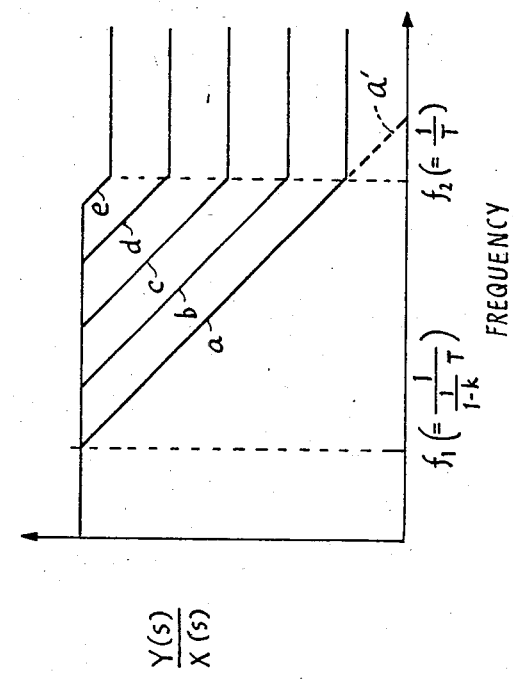
FIG. 8 is a waveform diagram associated with the embodiment of FIG. 7.

The operation of the noise reduction circuit 18B during recording modes will be explained with reference to FIG. 8. With mode selecting switches 12, 51 and 54 being switched to the record position, the difference between input signal Se from low-pass filter 3 and the output of mutiplier 52 is taken by the subtractor 30 and applied through low-pass filter 31 to the negative input of subtractor 32 to cause it to generate a differential signal Sf. Limiter 33 passes a differential signal Sg having amplitudes smaller than threshold $L_2$ to the multipliers 40 and 52. A signal Sh having an amplitude emphasized at the leading and trailing edges is obtained at the output of adder 53. The waveform of the signal Sh is thus complementary to that obtained when the noise reduction circuit 18B operates during playback modes.

As in the playback mode described in connection with FIG. 6, the application of a large-amplitude input signal to noise reduction circuit 18B from low-pass filter 3 causes the cutoff frequency $f_1$ to automatically rise and the amount of time in which the amplitude is cut-off by limiter 33 is reduced. In this way, the smear and noise which would occur in response to a large-amplitude signal can be further reduced.

Figure 9:
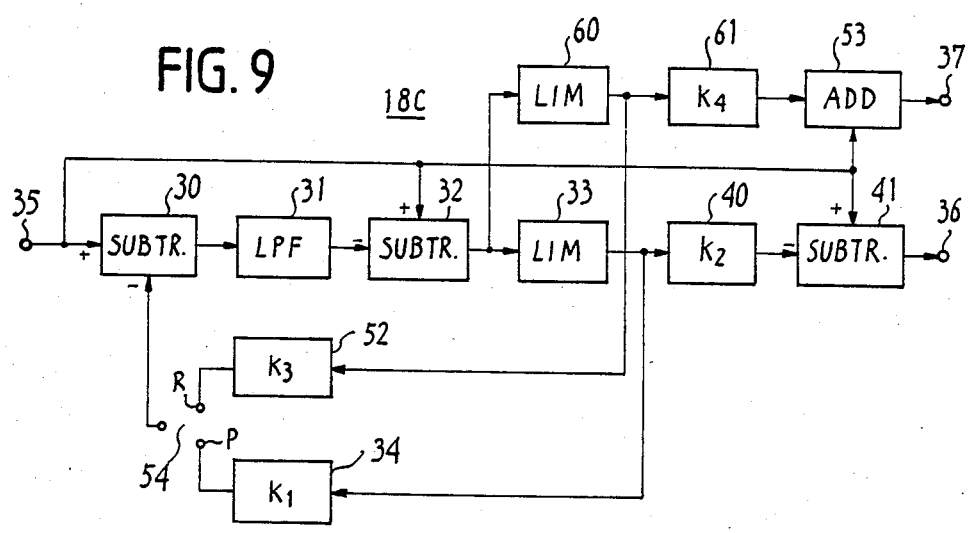
FIGS. 9 to 11 are block diagrams of modified forms of the embodiment of FIG. 7.

Another emodiment of the present invention is shown in FIG. 9. This embodiment, generally indicated at 18C, is a modification of the noise reduction circuit 18B by the inclusion of a limiter 60 and a multiplier 61 having a multiplying factor $k_4$ connected in a series circuit from the output of subtractor 32 to one input of adder 53. Multiplier 52 takes its input from the output of limiter 60. Signals appearing at the output of subtractor 32 during recording modes are passed through limiter 60, multiplier 61 and adder 53 to the recording output terminal 37, and the output of limiter 60 is fed back through multiplier 52 and switch 54 to the negative input of subtractor 30. Signals appearing at the output of subtractor 32 during playback modes are passed through limiter 33, multiplier 40 and subtractor 41 to the playback output terminal 36, and the output of limiter 33 is fed back through multiplier 34 and switch 54 to the subtractor 30. This embodiment allows limiter 60 and multiplier 61 to have respective recording parameters different from the playback parameters of limiter 33 and multiplier 40 so that the recording and playback characteristics of the noise reduction circuit are precisely complementary to each other.

Figure 10:
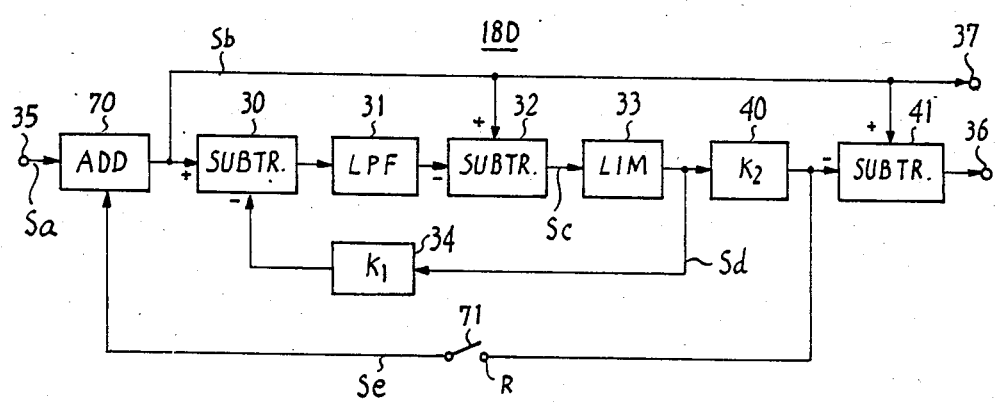
Figure 11:
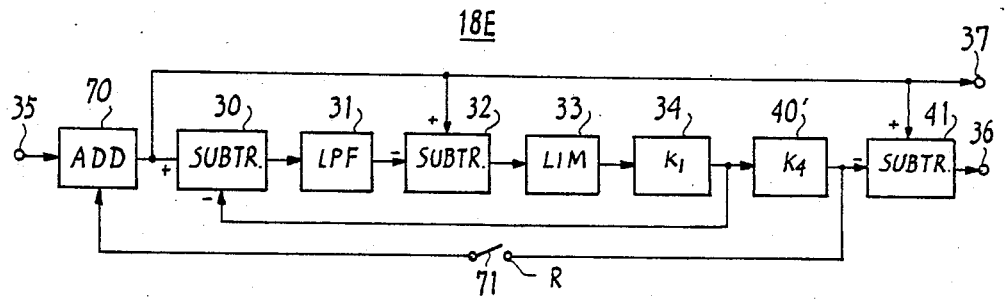
Figure 12:
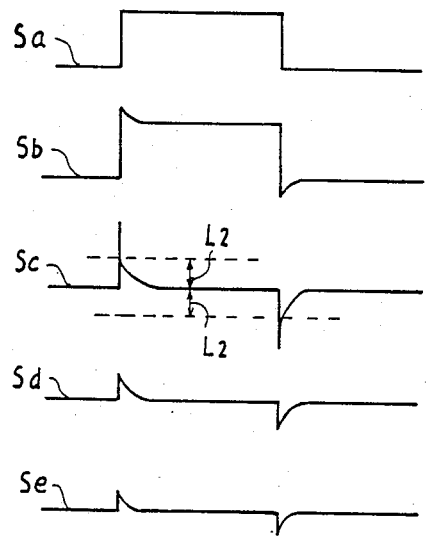
FIG. 12 is a waveform diagram associated with the emboidments of FIGS. 10 and 11.

Noise reduction circuit 18B of FIG. 7 can be further modified as shown at 18D in FIG. 10. The circuit 18D is basically similar in configuration to the circuit 18A, FIG. 6, but differs therefrom by the inclusion of an adder 70 and a recording switch 71. One input of adder 70 is connected to the input terminal 35 and its output to the positive input of subtractor 30. Another input of adder 70 is connected by switch 71 to the output of multiplier 40. The operation of noise reduction circuit 18D will be understood by reference to FIG. 12. During a recording mode, signal Sa is supplied from low-pass filter 3 to adder 70 which sums it with an output signal Se from multiplier 40 to supply a summed output Sb to the positive input of subtractor 30. The output of subtractor 30 is a difference between the signal Sb and the output of multiplier 34 which multiplies a signal Sd from limiter 33 by a factor $k_1$. Through low-pass filter 31 the output of subtractor 31 is passed to second subtractor 32 which supplies a signal Sc representative of the difference between signal Sb and the output of low-pass filter 33. Signal Sd from limiter 33 is multiplied by $k_2$ by multiplier 40 and fed back to adder 70 to be summed with the input signal at terminal 35. During the recording mode, the output signal of noise reduction circuit 18D is taken from the output of adder 70. During playback modes, switch 71 is open and the output signal of noise reduction circuit 18D is taken from the output of subtractor 41. The operation of noise reduction circuit 18D during playback modes is identical to the circuit 18A, FIG. 6. As indicated at 40' in FIG. 11, the input of multiplier 40 can be taken from the output of multiplier 34. In this instance, multiplier 40 has a multiplying factor $k_4$ which equals the division of the factor $k_2$ of multiplier 40, FIG. 10, by the factor $k_1$.

If the multiplying factors $k_1$ and $k_2$ are equal to each other, the multiplier 40 and subtractor 41 can be dispensed with as shown at 18F in FIG. 13. In other words, the noise reduction circuit 18F is similar to the circuit 18, FIG. 2, with the exception that adder 70 and switch 71 are provided.

Figure 14:
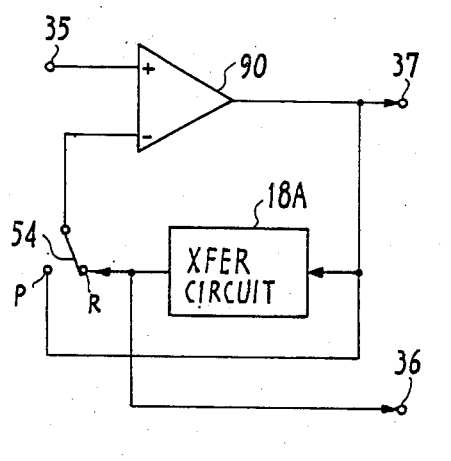
FIGS. 14 and 15 are block diagrams of modified forms of the embodiment of FIG. 7, using the emboidment of FIG. 6 as a transfer circuit.
Figure 15:
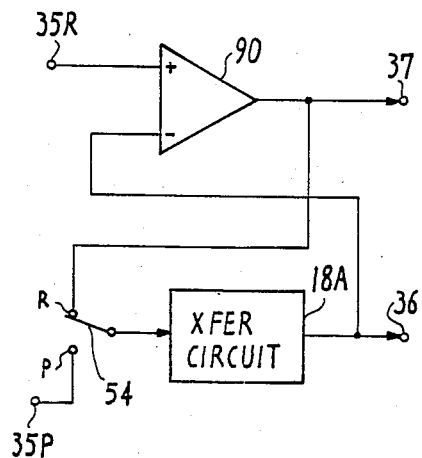

Further alternative embodiments of the noise reduction circuit 18B are shown in FIGS. 14 and 15 in which the noise reduction circuit 18A, FIG. 6, is employed as a feedback transfer circuit. During a recording mode, FIG. 14, the output of low-pass filter 3 is coupled to the noninverting input of an operational amplifier 90 having an infinite amplification gain, the output of which is coupled to the playback output terminal 37 and to the input of transfer circuit 18A. The output of transfer circuit 18A is coupled by mode select switch 54 to the inverting input of operational amplifier 90. In a playback mode, the circuit between the output of transfer circuit 18A and the inverting input of operational amplifier 90 is disconnected and instead the output of operational amplifier 90 is coupled by switch 54 to the inverting input of operational amplifier 90. The output of transfer circuit 18A is applied to the playback output terminal 36. Thus, transfer circuit 18A is connected in the negative feedback circuit of the operational amplifier during recording modes and is directly coupled between the input and output terminals 35 and 36 during playback modes. The circuit configurations of the recording and playback modes are thus complementary to each other.

In FIG. 15, the output of operational amplifier 90 is connected via switch 54 to the input of transfer circuit 18A during recording modes, the output of transfer circuit 18A being coupled to the inverting input of operational amplifier 90. The noninverting input of operational amplifier 90 is connected to a recording input terminal 35R which is directly connected to the output of low-pass filter 3, FIG. 7. During playback modes, the transfer circuit 18A receives its input via switch 54 from a playback input terminal 35P which is directly connected to the output of deemphasis circuit 17, FIG. 7. Transfer circuit 18A is thus connected in the negative feedback circuit of the operational amplifier 90 during recording modes and is connected directly between the terminals 35P and 36 in playback modes.

The foregoing shows only preferred embodiments. Various modifications are apparent to those skilled in the art without departing from the scope of the invention which is only limited by the appended claims. Therefore, the embodiments shown and described are only illustrative, not restrictive.

What is claimed is:

1. A noise reduction circuit for reducing noise contained in a luminance signal reproduced from a record medium, comprising:

a first subtractor having a first input terminal to which said luminance signal is applied and a second input terminal;

a low-pass filter for passing therethrough a low-frequency component of an output signal from said first subtractor;

a second subtractor having a first input terminal to which said luminance signal is applied and a second input terminal to which the output of said low-pass filter is applied;

a limiter connected to the output of said second subtractor; and a feedback circuit coupling the output of said limiter to the second input terminal of said first subtractor.

2. A noise reduction circuit as claimed in claim 1, wherein said feedback circuit includes scaling means for scaling the output of said limiter with a prescribed weighting factor and applying a scaled output to the second input terminal of said first subtractor.

3. A noise reduction circuit for a video recording and playback apparatus, the apparatus including a recording section for generating a luminance signal during a recording mode and a playback section for reproducing the luminance signal during a playback mode, comprising:

a first subtractor having a first input terminal responsive to each one of said generated and reproduced luminance signals and a second input terminal;

a low-pass filter for passing therethrough a low-frequency component of an output signal from said first subtractor;

a second subtractor having a first input terminal responsive to each one of said generated and reproduced luminance signals and a second input terminal to which the output of said low-pass filter is applied;

a limiter connected to the output of said second subtractor;

a feedback circuit coupling an output signal from said limiter to the second input terminal of said first subtractor; and combining means operable during said recording mode for combining an output signal from said limiter with said generated luminance signal and applying a combined output to said recording section.

4. A noise reduction circuit as claimed in claim 3, wherein said feedback circuit includes scaling means (34, FIG. 13) for scaling the output of said limiter (33) with a prescribed weighting factor ($k_1$) and applying a scaled output to the second input terminal of said first subtractor (30), and wherein said combining means comprises an adder (70, 71) for summing the generated luminance signal with the output of said scaling means (34) during said recording mode, and said first subtractor (30) being responsive to an output signal from said adder (70) and supplying a difference output to said playback section, the output of said first subtractor (30) being connected to said playback section.

5. A noise reduction circuit as claimed in claim 3, further comprising a third subtractor (41) having a first input terminal responsive to said reproduced luminance signal and a second input terminal responsive to an output signal from said limiter and applying an output to said playback section.

6. A noise reduction circuit as claimed in claim 5, further comprising:
first scaling means (34, 52, 54, FIG. 7) for scaling the output of said limiter (33) with a first weighting factor ($k_3$) during said recording mode and scaling the output of said limiter with a second weighting factor ($k_1$) during said playback mode;
second scaling means (40) for scaling the output of said limiter with a third weighting factor ($k_2$); and
wherein said third subtractor (41) receives the output of said second scaling means (40) at the second input terminal thereof, and
wherein said combining means (53) comprises an adder for combining the generated luminance signal with the output of said second scaling means (40).

7. A noise reduction circuit as claimed in claim 3, further comprising:
first scaling means (34, 54, FIG. 9) for scaling the output of the first-mentioned limiter (33) with a first weighting factor ($k_1$) and applying a scaled output to the second input terminal of said first subtractor (30) during said playback mode;
second scaling means (40) for scaling the output of the first-mentioned limiter with a second weighting factor ($k_2$);
a third subtractor (41) having a first input terminal connected to the output of said second scaling means (40) and a second input terminal responsive to the reproduced luminance signal, the output of the third subtractor (41) being connected to said recording section;
a second limiter (60) connected to the output of said second subtractor (32);
third scaling means (52, 54) for scaling the output of said second limiter (60) with a third weighting factor ($k_3$) and applying the scaled output to the second input terminal of said first subtractor (30) during said recording mode; and
fourth scaling means (61) for scaling the output of said second limiter (60) with a fourth weighting factor ($k_4$),
wherein said combining means (53) comprises an adder for providing summation of the output of said fourth scaling means (61) with the generated luminance signal.

8. A noise reduction circuit as claimed in claim 5, further comprising:
first scaling means (34, FIG. 10) for scaling the output of said limiter (33) with a first weighting factor ($k_1$); and
second scaling means (40) for scaling the output of said limiter with a second weighting factor ($k_2$),
wherein said third subtractor (41) receives the output of said second scaling means (40) at the second input terminal thereof, and
wherein said combining means (70, 71) comprises an adder for providing summation of said generated luminance signal with the output of said second scaling means (40).

9. A noise reduction circuit as claimed in claim 5, further comprising:
first scaling means (34, FIG. 11) for scaling the output of said limiter (33) with a first weighting factor ($k_1$); and
second scaling means (40') for scaling the output of said scaling means (34) with a second weighting factor ($k_4$),
wherein said third subtractor (41) receives the output of said second scaling means (40') at the second input terminal thereof, and
wherein said combining means (70, 71) provides summation of the generated luminance signal with the output of said second scaling means (40').

Figure 16:
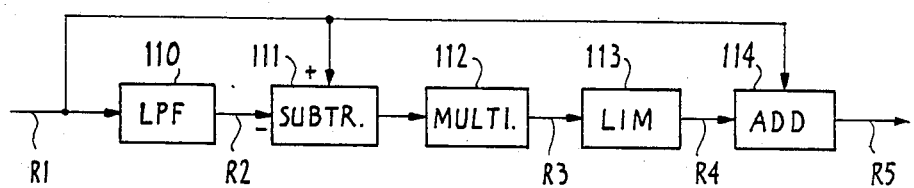
FIG. 16 is a block diagram of a prior art noise reduction circuit employed in the recording section of a video recording and playback apparatus.
Figure 17:
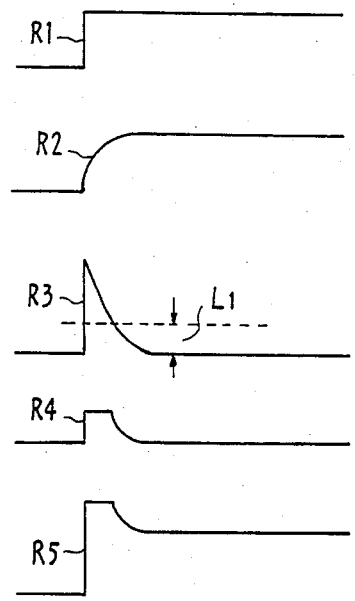
FIG. 17 is a waveform diagram associated with the prior art embodiment of FIG. 16.
Figure 19:
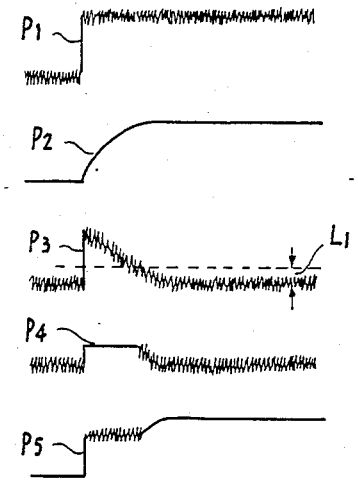
FIG. 19 is a waveform diagram associated with the prior art embodiment of FIG. 18.
Figure 18:
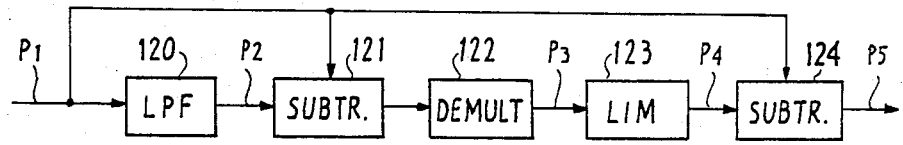
FIG. 18 is a block diagram of a prior art noise reduction circuit employed in the playback section of the apparatus.

10. A noise reduction circuit as claimed in claim 5, further comprising:
first scaling means (34, FIGS. 6, 15, 16) for scaling the output of said limiter (33) with a first weighting factor ($k_1$);
second scaling means (40) for scaling the output of said limiter with a second weighting factor ($k_2$); and
wherein said third subtractor (41) receives the output of said second scaling means (40) at the second input terminal thereof, and
wherein said combining means (90, 54) comprises an operational amplifier (90) for combining each one of said generated and reproduced luminance signals with the output of said third subtractor (41) during said recording mode and means (54) for coupling the output of said third subtractor (41) to said playback section during said playback mode by decoupling the output of the third subtractor from said operational amplifier (90).

11. A noise reduction circuit for processing a luminance signal to be recorded in a record medium, comprising:
a first subtractor having a first input terminal to which said luminance signal is applied and a second input terminal;
a low-pass filter for passing therethrough a low-frequency component of an output signal from said first subtractor;
a second subtractor having a first input terminal to which said luminance signal is applied and a second input terminal to which the output of said low-pass filter is applied;
a limiter connected to the output of said second subtractor;
a feedback circuit coupling the output of said limiter to the second input terminal of said first subtractor; and
an adder for summing the output of said limiter with said luminance signal to generate an output signal of said noise reduction circuit.

* * * * *